United States Patent Office 2,908,674
Patented Oct. 13, 1959

2,908,674
PROCESS AND CATALYST FOR PRODUCTION OF OLEFIN POLYMERS

Gene Nowlin and Harold D. Lyons, Bartlesville, Okla., assignors to Phillips Petroleum Company, a corporation of Delaware No Drawing. Application April 25, 1955
Serial No. 503,798

14 Claims. (Cl. 260—94.9)

This invention relates to the polymerization of olefins. In one aspect, this invention relates to an improved method for polymerizing olefins in the presence of a novel catalyst system.

Reactions for polymerizing olefins are well known in the art and are generally carried out in the presence of catalysts. One class of catalysts which has been used in the polymerization of monoolefins, particularly ethylene, is organometal compounds, for example triethylaluminum, and the polymers which have been obtained in accordance with this method are generally liquid or low molecular weight solid polymers. Frequently, the polymers obtained are dimers or trimers of the olefin charged. The most valuable polymers, however, are higher molecular weight polymers which have desirable properties of heat stability and can be molded into vessels, pipes and tubing.

It has now been discovered that an unexpected improvement is obtained when an olefin such as ethylene is polymerized in the presence of a catalyst composition comprising a mixture of an oxide or an oxyhalide of certain metals of group IV of the periodic table (Mendeléeff's Periodic System) and at least one component selected from the following: (a) a hydride or organo compound of one of the metals aluminum, gallium, indium, thallium, and beryllium; (b) an organometal halide corresponding to the formula $R_nMX_y$ wherein R is a saturated acyclic hydrocarbon radical, a saturated cyclic hydrocarbon radical, an aromatic hydrocarbon radical, or combinations of these radicals, wherein M is a metal selected from the group consisting of aluminum, gallium, indium, thallium, and beryllium and wherein X is a halogen, and wherein $n$ and $y$ are integers, the sum of $n$ and $y$ being equal to the valence of the metal; and (c) a mixture of an organic halide and at least one metal selected from the group consisting of sodium, potassium, lithium, rubidium, cesium, beryllium, magnesium, zinc, cadmium, mercury, aluminum, gallium, indium, and thallium. As indicated, the catalyst composition of this invention comprises an oxide or an oxyhalide of certain group IV metals together with mixtures of components (a), (b) and (c) as well as mixtures of the group IV metal oxide or oxyhalide and any one or any two of components (a), (b) or (c). The improvement obtained when polymerizing an olefin in the presence of our novel catalyst is, firstly, that polymers of much higher molecular weight can be obtained than is true when certain of the prior art catalysts have been employed, and secondly, the polymerization reaction, particularly for ethylene, can be initiated and carried out at considerably lower temperatures and pressures than are necessary when employing the catalysts and processes of the prior art.

The metal oxide or metal oxyhalide component of our catalyst system comprises at least one of the oxides or oxyhalides of metals of group IV selected from the group consisting of titanium, zirconium, tin, lead, hafnium, thorium, germanium, and cerium. Mixtures of these oxides and/or oxyhalides of the group IV metals can also be employed. Although any one or mixtures of these group IV metal oxides or oxyhalides are useful in our process, we prefer to use one of the group titanium dioxide ($TiO_2$), zirconium dioxide ($ZrO_2$), hafnium dioxide ($HfO_2$), thorium dioxide ($ThO_2$), titanium oxychloride ($TiOCl_2$), zirconium oxychloride ($ZrOCl_2$), zirconium oxybromide ($ZrOBr_2$), zirconium oxyfluoride ($ZrOF_2$), thorium oxychloride ($ThOCl_2$), germanium oxychloride ($GeOCl_2$), and tin oxychloride ($SnOCl_2$). In addition, compounds such as TiO, $Ti_2O_3$, $ZrOI_2$, $HfOCl_2$, SnO, $SnO_2$, $GeO_2$, $PbO_2$, and $Pb_2OI_2$ as well as other lead, tin, and germanium oxides can be employed. The titanium dioxide can be used in the form of rutile, anatase, or brookite. These oxides and oxyhalides are preferably employed in the anhydrous or substantially anhydrous form.

In admixture with one or more of the group IV metal oxides or oxyhalides described above, our novel catalyst comprises a hydride or organo compound of the metals aluminum, gallium, indium, thallium or beryllium. The general formula for the latter compound is $M'R'_n$, wherein M' is one of the metals aluminum, gallium, indium, thallium or beryllium and R' is hydrogen, a monovalent saturated acylic hydrocarbon radical, a monovalent saturated cyclic hydrocarbon radical, a monovalent aromatic hydrocarbon radical or any combination thereof, and wherein $n$ is the valence of the metal, i.e., 2 or 3. Examples of these compounds corresponding to the formula $M'R'_n$ which can be used are $Al(C_6H_5)_3$, $Al(CH_3)_3$, $HAl(C_2H_5)_2$, $H_2AlCH_3$
$Be(CH_3)_2$, $AlH_3$, $Ga(C_3H_7)_3$, $In(CH_3)_3$, $Be(C_6H_5)_2$
$Al(C_6H_{13})_3$, $Al(CH_2—(CH_2)_{18}—CH_3)_3$, $Ga(C_6H_5)_3$ $In(C_6H_5)_3$ and the like. These $M'R'_n$ compounds can also be used in the form of their known and stable organic complexes, such as complexes with ethers, thioethers, amines, alkali metal hydrides, alkali metal alkyls or alkali metal aryls. Examples of such complex compounds which can be used in admixture with a group IV metal oxide or oxyhalide as the catalyst are $LiAlH_4$, $NaAl(CH_3)_4$, $NaBe(C_6H_5)_3$, $NaBe(C_2H_5)_3$ and the like.

Alternatively, or in addition to the $M'R'_n$ compounds set forth, our catalyst comprises a mixture of a group IV metal oxide or oxyhalide and at least one organometal halide corresponding to the formula $R_nMX_y$, wherein R is a saturated acyclic hydrocarbon radical, a saturated cyclic hydrocarbon radical, an aromatic hydrocarbon radical, or mixtures of these radicals, wherein M is a metal selected from the group consisting of aluminum, gallium, indium, thallium and beryllium, and wherein X is a halogen. The $n$ and $y$ are integers and the sum of $n$ and $y$ is equal to the valence of the metal M. X can be any of the halogens, including chlorine, bromine, iodine and fluorine. The saturated acyclic hydrocarbon radicals, saturated cyclic hydrocarbon radicals, and aromatic hydrocarbon radicals which can be substituted for R in the formula include hydrocarbon radicals having up to about 20 carbon atoms each. Radicals having 10 carbon atoms or less are preferred since the resulting catalyst composition has a greater activity for initiating the polymerization of olefins. Mixtures of one or more of these organometal halide components, such as a mixture of ethylaluminum dichloride and diethylaluminum chloride, can be used in our catalyst composition. Specific examples of other organometal halides which are useful in the catalyst composition of this invention are the following:

$CH_3AlCl_2$, $(CH_3)_2AlCl$, $C_2H_5AlCl_2$, $(C_2H_5)_2AlCl$
$(C_4H_9)_2AlBr$, $C_8H_{17}AlI_2$, $(C_3H_7)_2GaF$
$(C_6H_{11})_2GaCl$ (cyclohexane derivative), $(C_6H_5)GaBr_2$,[1]
$C_{20}H_{41}GaBr_2$, $(C_{14}H_{29})_2GaF$, $(C_6H_5)_2InCl$
$C_8H_{17}InF_2$, $(C_6H_{11})InBr_2$ (cyclohexane derivative)
$C_{17}H_{35}BeI$, $CH_3BeBr$ and the like.

[1] Benzene derivative.

Alternatively, or in addition to the $M'R'_n$ compounds and/or $R_nMX_y$ compounds set forth above, our catalyst comprises a mixture of the group IV metal oxides or oxyhalides and a mixture of an organic halide and a free or elemental metal. These organic halides include chloro-, bromo-, iodo- and fluoro-substituted organic halides, and can be mono-, di-, tri- or tetra-substituted organic halides. Within the broad class of organic halides which is a component of our novel catalyst composition, the class of halides defined as monohalogen-substituted hydrocarbons having a maximum carbon chain length of not greater than 8 carbon atoms are preferred since they are more easily handled in a commercial operation and are active to initiate the polymerization of olefins in the catalyst composition of this invention. Still more preferably, the organic halide which is used in the catalyst is a lower alkyl monohalide having a maximum carbon chain length of not greater than 8 carbon atoms. Examples of these organic halides which can be used in the catalyst are ethyl bromide, propyl chloride, butyl iodide and pentyl fluoride. Other examples are 1,2-dibromoethane, 1,3-dibromopropane, 1,2,3-tribromopropane, 1,2,3-trichloropropane, 1,1-difluoroethane, and 1,4-diiodobutane. Other acyclic and cyclic halides as well as aromatic halides can be employed also. Examples of these are 1,3-dichlorocyclohexane, benzyl chloride, 1,4-dichlorobenzene, 1-bromodecane, 1-chlorododecane, 2-chlorooctane, 2-chloro-4-methyloctane, cyclopentyl chloride, 1-chloro-3-phenylpropane, 1-bromo-3-phenylhexane, cyclohexyl chloride and phenyl chloride. Also, alkenyl halides, such as allyl bromide, and alkynyl halides, such as propargyl chloride, can be used. The metals which are employed in admixture with an organic halide include one or more of sodium, potassium, lithium, rubidium, cesium, beryllium, magnesium, zinc, cadmium, mercury, aluminum, gallium, indium, and thallium. The metals are usually used in the form of shavings, turnings or finely divided powder. Various mixtures or combinations of the above-mentioned organic halides and metals can be employed in the catalyst composition of this invention.

As has been indicated, all possible combinations of a hydride or organo compound corresponding to the formula $M'R'_n$ and/or an organometal halide corresponding to the formula $R_nMX_y$ and/or a mixture of an organic halide and a free or elemental metal as set forth above with the group IV metal oxides or oxyhalides are used in the catalyst composition of this invention. The catalyst compositions falling within this disclosure which are preferred because of their use to catalyze the polymerization of olefins provides relatively high molecular weight polymers and/or permits the use of relatively low reaction temperatures and pressures are the following: a mixture of titanium dioxide with an approximately equimolar mixture of ethylaluminum dichloride and diethylaluminum chloride; a mixture of titanium dioxide and triethylaluminum; a mixture of titanium dioxide and lithium aluminum hydride; a mixture of zirconium dioxide with an approximately equimolar mixture of ethylaluminum dichloride and diethylaluminum chloride; and, a mixture of thorium dioxide with an approximately equimolar mixture of ethylaluminum dichloride and diethylaluminum chloride.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher.

The ratio of the amounts of organometal compound having the formula $M'R'_n$ to the group IV metal oxide or oxyhalide is usually in the range of 0.05 to 50, preferably 0.1 to 5, mols of organometal compound per mol of the group IV metal oxide or oxyhalide. The ratio of organometal halide having the formula $R_nMX_y$ to group IV metal oxide or oxyhalide is in the range of 0.05 to 50 preferably 0.1 to 5, mols of organometal halide per mol of the group IV metal oxide or oxyhalide. The ratio of the amounts of organic halide and free metal to the group IV metal oxide or oxyhalide is in the range of 0.02 to 50 mols of the organic halide per mol of the group IV metal oxide or oxyhalide and from 0.02 to 50 mols of the free metal per mol of the group IV metal oxide or oxyhalide and a preferred ratio is from 0.1 to 5 mols of organic halide per mol of the group IV metal oxide or oxyhalide and from 0.1 to 5 mols of free metal per mol of the group IV metal oxide or oxyhalide.

The materials which are polymerized, in accordance with this invention, are polymerizable hydrocarbons, broadly. Preferably, the polymerizable hydrocarbons are olefins containing a $CH_2=C<$ radical. The most preferred class of polymerizable hydrocarbons used is aliphatic 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the processes of the prior art mentioned above. Examples of other polymerizable hydrocarbons which can be used in the process of this invention are propylene, 1-butene, 1-hexene and 1-octene. Branched chain olefins can also be used, such as isobutylene. Also, 1,1-dialkyl-substituted and 1,2-dialkyl-substituted ethylene can also be used, such as butene-2, pentene-2, hexene-2, heptene 3, 2-methyl-butene-1, 2-methyl-hexene-1, 2-ethyl-heptene-1, and the like. Examples of the di- and polyolefins in which the double bonds are in non-conjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of our novel catalyst as, for example, by copolymerizing ethylene and propylene, ethylene and 1-butene, propylene and 1-butene, or propylene and a pentene. Also, aryl olefins, e.g., styrene and alkyl-substituted styrenes can be polymerized to a solid polymer in the process of this invention.

One of the important advantages obtained in the polymerization of olefins in the presence of our novel catalyst is that lower temperatures and pressures can be used than in certain of the prior art processes. The temperature can be varied over a rather broad range, however, such as from 100 to 500° F. The preferred temperature range is from 200 to 350° F. Although pressures ranging from atmospheric up to 30,000 p.s.i.g. or higher can be employed, a pressure in the range of 100 to 1000 p.s.i.g. is usually preferred.

In this connection, it is noted that it is preferred to carry out the reaction in the presence of an inert, organic hydrocarbon diluent with a pressure sufficient to maintain the diluent in the liquid phase, giving rise to a so-called "mixed-phase" system. However, the polymerization process of this invention proceeds in the gaseous phase without a diluent. The preferred pressure range set forth above has been found to produce solid polymers of olefins in excellent yields.

Suitable diluents for use in the polymerization process are paraffins, halogenated paraffins, cycloparaffins and/or aromatic hydrocarbons which are relatively inert, non-deleterious and liquid under the conditions of the process. The lower molecular weight alkanes, such as propane, butane, and pentane can be used as well as the higher molecular weight paraffins and cycloparaffins, such as isooctane, cyclohexane and methylcyclohexane. Halogenated aromatic, such as chlorobenzene, and aromatic diluents can also be used, such as benzene, toluene, and the like, particularly when operating at higher temperatures. Mixtures of these diluents can also be used, such as a mixture of benzene and toluene, and the like, particularly when operating at higher temperatures.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends upon the temperature at which the process is carried out to a great extent. The residence time also varies with the specific olefin that is polymerized. However, the residence time for the polymerization of aliphatic monoolefins, within the preferred temperature range of 200 to 350° F., falls within the range of one second to an hour or more. In the batch process, the time for the reaction can vary widely, also, such as up to 24 hours or more.

Various materials are known to be poisons for the catalyst composition of this invention. These materials include carbon dioxide, oxygen and water. Therefore, it is usually desirable to free the polymerizable hydrocarbon from these materials, as well as from other materials which tend to inactivate the catalyst before contacting the hydrocarbon with the catalyst. Any of the known means for removing such contaminants can be employed. When a diluent is used in the process, this material should be freed of contaminants, such as water, oxygen, and the like. It is desirable, also, that air and moisture be removed from the reaction vessel before the reaction is carried out.

At the completion of the polymerization reaction, the catalyst is killed or inactivated by any suitable means such as by treatment with an alcohol, and the solid olefin polymer is separated from the diluent if such was used, for example by distillation, decantation or the like. The polymer is then washed with an alcohol or water or other suitable material and finally dried. If desired, the product can be comminuted in a suitable grinder or the like during the purification and/or washing steps. When the process of the invention is carried out continuously, the polymer, diluent and catalyst system are pumped out of the reactor, the catalyst is treated with a catalyst-inactivating material, such as an alcohol, the diluent and alcohol are separated from the polymer, for example by filtration, and the polymer is then dried to provide the desired polymeric product.

EXAMPLE

Ethylene was polymerized in a 2700 cubic centimeter stainless steel rocking autoclave in the presence of a catalyst consisting of 3.0 grams of titanium dioxide ($TiO_2$) and 3 cubic centimeters of a mixture of diethylaluminum chloride and ethylaluminum dichloride. The autoclave was charged with 500 cubic centimeters of benzene (dried over sodium) prior to the addition of the catalyst components. The reactor was flushed with nitrogen prior to and during the charging procedure to prevent contact of the catalyst with air or moisture. The ethylene feed was passed through a purification system to remove oxygen, carbon dioxide, and water vapor prior to entering the reactor. The purification system comprised a pyrogallol solution, a sodium hydroxide solution, and a drying agent.

The mixture of diethylaluminum chloride and ethylaluminum dichloride was prepared by placing 150 grams of aluminum shavings in a flask fitted with a reflux condenser and heated to about 70° C. A trace of iodine was added to the flask to act as a catalyst and ethyl chloride was charged to the flask in liquid phase. The temperature of the reaction mixture was maintained in the range of 120 to 150° C. during the addition of ethyl chloride and the reaction mixture was maintained under a nitrogen atmosphere. When substantially all of the aluminum shavings had reacted with the ethyl chloride, the liquid product was removed from the flask and fractionally distilled at 4.5 millimeters mercury pressure in a packed distillation column. Four grams of the distillate, boiling at 72 to 74° C. at 4.5 millimeters mercury pressure, was used in the catalyst composition of this invention, as set forth above. This fraction boiling at 72 to 74° C. was analyzed and was found to contain 47.4 weight percent chlorine. The theoretical chlorine content for an equimolar mixture of diethylaluminum chloride and ethylaluminum dichloride is 43 weight percent.

Ethylene was added to the autoclave containing the benzene and catalyst until a pressure of 300 p.s.i.g. was reached. The autoclave and contents were at a temperature of approximately 81° F. at the time of the initial charging of ethylene. The reactor and contents were heated up gradually after the addition of the ethylene and at the end of approximately 33 minutes the temperature had increased to about 176° F. and the pressure was about 325 p.s.i.g. It was noted that this pressure was much lower than it would have been in the absence of any polymerization of the ethylene. Since there were no leaks in the system, it was apparent that the polymerization of ethylene was initiated during the 33-minute heating period and at a temperature no higher than 176° F. At the end of an additional 17-minute heating period the temperature was about 195° F. and the pressure had dropped to 300 p.s.i.g. At this point the heating was discontinued for the remainder of the polymerization run. The temperature continued to increase, finally reaching 242° F., and the pressure continued to decrease until it reached about 225 p.s.i.g. approximately 40 minutes after the heating was discontinued. The reactor was repressured with ethylene to about 300 p.s.i.g. at this time. At the end of an additional 68 minutes the temperature was about 216° F. and the pressure was about 165 p.s.i.g. The reactor was repressured with ethylene several more times as the polymerization continued. After the final repressuring it was allowed to remain overnight to cool down to approximately room temperature. After venting a small amount of unreacted ethylene remaining in the polymerization reactor, the product was removed and was found to be a yellow to yellowish-green ethylene polymer. The polymer had adsorbed or dissolved the benzene solvent which had been charged initially. The product was finely divided in a Waring Blendor using about 300 cubic centimeters of isopropyl alcohol per 100 grams of the solid polymer. The finely divided ethylene polymer was separated from the liquid and was finally dried. About 231 grams of product was recovered.

The physical properties of a compression molded sample of the solid polymer of ethylene produced are presented below in the table.

Table

| | |
|---|---|
| Specific gravity at 78° F., gr./cc | 0.972 |
| Melting point, °F | 248 |
| Melt index | 0.028 |
| Molecular weight based on melt index value | 65,000 |

The ethylene used in the example was obtained from The Matheson Company, Inc., Joliet, Illinois, and had a purity of 99.5 percent. The titanium dioxide used in the example was obtained from the Titanium Division, National Lead Company, South Amboy, New Jersey. The titanium dioxide had a symbol designation of R 1257, a melting point of 1011° C., a surface area of 102 square meters per gram and a purity of 94.8 percent.

The polymers and copolymers produced in accordance with this invention have utility in applications where solid plastics are used. They can be molded to form articles of any desired shape, such as bottles and other containers for liquids. Also, they can be formed into pipe or tubing by extrusion.

As will be evident to those skilled in the art, many variations and modifications can be practiced within the scope of the disclosure and claims to this invention. The invention resides in an improved polymerization process for olefins, as described herein, comprising the use of a novel catalyst composition for the process and the polymers so produced, wherein said novel catalyst comprises a mixture of an oxide or an oxyhalide of a group IV metal selected from the group consisting of titanium, zirconium, tin, lead, hafnium, thorium, germanium and cerium and at least one of (a) hydrides or organo compounds corresponding to the formula $M'R'_n$, as described above; (b) organometal halides corresponding to the formula $R_nMX_y$, as described above; and (c) a mixture of an organic halide and at least one free or elemental metal selected from the group consisting of sodium, potassium, lithium, rubidium, cesium, beryllium, magnesium, zinc, cadmium, mercury, aluminum, gallium, indium and thalium.

We claim:
1. A method for polymerizing ethylene which comprises, polymerizing ethylene with a catalyst consisting essentially of a mixture of from 0.1 to 5 mols of a mixture of diethylaluminum chloride and ethylaluminum dichloride per mol of titanium dioxide, in the presence of a hydrocarbon diluent, inert and liquid under conditions of the method, at a temperature in the range from 200 to 350° F. and a pressure in the range from 100 to 1000 p.s.i.g.

2. A method for polymerizing an aliphatic 1-olefin having up to and including 8 carbon atoms per molecule which comprises polymerizing said olefin with a catalyst consisting essentially of (1) a first component selected from the group consisting of titanium dioxide, zirconium dioxide and thorium dioxide, and (2) a second component selected from the group consisting of (a) a trialkylaluminum, (b) an alkali metal aluminum hydride, and (c) an organometal halide corresponding to the formula $R_nAlX_y$, wherein R is an alkyl radical, X is a halogen and $n$ and $y$ are integers, the sum of $n$ and $y$ being equal to the valence of aluminum, the ratio of the amounts of said components in said catalyst being in the range of 0.05 to 50 mols of said second component per mol of said first component.

3. A method for polymerizing ethylene which comprises polymerizing ethylene with a catalyst consisting essentially of a mixture of from 0.05 to 50 mols of an approximately equimolar mixture of ethylaluminum dichloride and diethylaluminum chloride per mol of titanium dioxide.

4. A method for polymerizing ethylene which comprises polymerizing said ethylene with a catalyst consisting essentially of a mixture of from 0.05 to 50 mols of triethylaluminum per mol of titanium dioxide.

5. A method for polymerizing ethylene which comprises polymerizing said ethylene with a catalyst consisting essentially of a mixture of from 0.5 to 50 mols of lithium aluminum hydride per mol of titanium dioxide.

6. A method for polymerizing ethylene which comprises contacting said ethylene with a catalyst consisting essentially of a mixture of from 0.05 to 50 mols of an approximately equimolar mixture of diethylaluminum chloride and ethylaluminum dichloride per mol of zirconium dioxide.

7. A method for polymerizing ethylene which comprises polymerizing said ethylene with a catalyst consisting essentially of a mixture of from 0.05 to 50 mols of an approximately equimolar mixture of diethylaluminum chloride and ethylaluminum dichloride per mol of thorium dioxide.

8. A method for polymerizing an aliphatic 1-olefin having up to and including 8 carbon atoms per molecule which comprises polymerizing said olefin with a catalyst consisting essentially of (1) a first component selected from the group consisting of titanium dioxide, zirconium dioxide, and thorium dioxide and (2) a second component selected from the group consisting of (a) a trialkylaluminum, (b) an alkali metal aluminum hydride and (c) an organometal halide corresponding to the formula $R_nAlX_y$, wherein R is an alkyl radical, X is a halogen and $n$ and $y$ are integers, the sum of $n$ and $y$ being equal to the valence of aluminum, the ratio of the amounts of said components in said catalyst being in the range of 0.05 to 50 mols of said second component per mol of said first component, and said polymerizing occurring at a temperature in the range of 100 to 500° F., in the presence of a hydrocarbon diluent, inert and liquid under conditions of the method, and at a pressure sufficient to maintain said diluent in liquid phase.

9. A catalyst composition consisting essentially of (1) a first component selected from the group consisting of titanium dioxide, zirconium dioxide and thorium dioxide and (2) a second component selected from the group consisting of (a) a trialkylaluminum, (b) an alkali metal aluminum hydride and (c) an organometal halide corresponding to the formula $R_nAlX_y$, wherein R is an alkyl radical, X is a halogen, $n$ and $y$ are integers, the sum of $n$ and $y$ being equal to the valence of aluminum, the ratio of the amounts of said components being in the range of 0.05 to 50 mols of said second component per mol of said first component.

10. A catalyst composition consisting essentially of a mixture of from 0.05 to 50 mols of a mixture of diethylaluminum chloride and ethylaluminum dichloride per mol of titanium dioxide.

11. A catalyst composition consisting essentially of a mixture of from 0.05 to 50 mols of triethylaluminum per mol of titanium dioxide.

12. A catalyst composition consisting essentially of a mixture of from 0.05 to 50 mols of lithium aluminum hydride per mol of titanium dioxide.

13. A catalyst composition consisting essentially of a mixture of from 0.05 to 50 mols of a mixture of diethylaluminum chloride and ethylaluminum dichloride per mol of zirconium dioxide.

14. A catalyst composition consisting essentially of a mixture of from 0.05 to 50 mols of a mixture of diethylaluminum chloride and ethylaluminum dichloride per mol of thorium dioxide.

References Cited in the file of this patent

UNITED STATES PATENTS

| | | |
|---|---|---|
| 1,914,557 | Craver | June 20, 1933 |
| 2,710,854 | Seelig | June 14, 1955 |
| 2,721,189 | Anderson et al. | Oct. 18, 1955 |
| 2,731,453 | Field et al. | Jan. 17, 1956 |
| 2,816,883 | Larchar | Dec. 17, 1957 |

FOREIGN PATENTS

| | | |
|---|---|---|
| 534,792 | Belgium | Jan. 31, 1955 |
| 534,888 | Belgium | Jan. 31, 1955 |